(12) United States Patent
Slager et al.

(10) Patent No.: US 7,824,655 B2
(45) Date of Patent: Nov. 2, 2010

(54) REGENERATION OF COMPLEX METAL OXIDES FOR THE PRODUCTION OF HYDROGEN

(75) Inventors: Terry Lee Slager, Allentown, PA (US); Diwakar Garg, Emmaus, PA (US); Xiang-Dong Peng, Orefield, PA (US); Bryan Clair Hoke, Jr., Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 788 days.

(21) Appl. No.: 11/339,060

(22) Filed: Jan. 25, 2006

(65) Prior Publication Data

US 2007/0172418 A1 Jul. 26, 2007

(51) Int. Cl.
  *C01B 3/24* (2006.01)
  *C01B 3/26* (2006.01)
(52) U.S. Cl. .................................. 423/650; 423/651
(58) Field of Classification Search ............... 423/652
   See application file for complete search history.

(56) References Cited

U.S. PATENT DOCUMENTS

| | | | |
|---|---|---|---|
| 4,578,089 A | 3/1986 | Richter et al. | |
| 5,055,441 A | 10/1991 | McCarron, III et al. | |
| 5,208,358 A * | 5/1993 | Dinh et al. ................ | 556/445 |
| 5,827,496 A | 10/1998 | Lyon | |
| 6,007,699 A | 12/1999 | Cole | |
| 6,238,816 B1 | 5/2001 | Cable et al. | |
| 6,322,766 B1 | 11/2001 | Schicketanz et al. | |
| 6,506,510 B1 | 1/2003 | Sioui et al. | |
| 6,682,838 B2 | 1/2004 | Stevens | |
| 6,761,838 B2 | 7/2004 | Zeng et al. | |
| 6,767,530 B2 | 7/2004 | Kobayashi et al. | |
| 6,974,566 B2 | 12/2005 | Sabacky et al. | |
| 7,070,752 B2 | 7/2006 | Zeng et al. | |
| 7,438,889 B2 * | 10/2008 | Pez et al. ................ | 423/652 |
| 2002/0010220 A1 | 1/2002 | Zeng | |
| 2002/0071806 A1 | 6/2002 | Sabacky et al. | |

(Continued)

FOREIGN PATENT DOCUMENTS

EP  0 411 506 A2  2/1991

(Continued)

OTHER PUBLICATIONS

Waldron, W.E., et al.; "Parametric Study of a Pressure Swing Adsorption Process"; Adsorption; vol. 6; 2000; pp. 179-188; XP002464014.

(Continued)

*Primary Examiner*—Melvin C Mayes
*Assistant Examiner*—Kenneth Vaden
(74) *Attorney, Agent, or Firm*—Bryan C. Hoke, Jr.

(57) ABSTRACT

In a process for producing a hydrogen-containing gas, a hydrocarbon feed gas and steam are introduced into a reaction vessel containing a complex metal oxide and steam-hydrocarbon reforming catalyst thereby forming a combustible gas mixture comprising hydrogen. A regeneration gas comprising greater than 0.1 volume % oxygen up to and including 2 volume % oxygen is introduced into the reaction vessel to displace at least a portion of the combustible gas mixture from the reaction vessel. Subsequently, additional regeneration gases may be introduced into the reaction vessel. Numerous means for providing various regeneration gases are presented.

20 Claims, 2 Drawing Sheets

U.S. PATENT DOCUMENTS

| | | | |
|---|---|---|---|
| 2003/0035770 | A1 | 2/2003 | Cole |
| 2003/0150163 | A1 | 8/2003 | Murata et al. |
| 2003/0229151 | A1 | 12/2003 | Hurlburt et al. |
| 2004/0029715 | A1* | 2/2004 | Schindler et al. ............... 502/50 |
| 2004/0191166 | A1 | 9/2004 | Hershkowitz et al. |
| 2005/0112056 | A1 | 5/2005 | Hampden-Smith |
| 2005/0229488 | A1 | 10/2005 | Stevens |
| 2005/0229490 | A1 | 10/2005 | Stevens et al. |
| 2005/0232856 | A1 | 10/2005 | Stevens |
| 2007/0172419 | A1 | 7/2007 | Peng et al. |
| 2008/0308463 | A1* | 12/2008 | Keckler et al. ............... 208/249 |

FOREIGN PATENT DOCUMENTS

| | | | |
|---|---|---|---|
| EP | 0 737 648 | A2 | 10/1996 |
| EP | 1 134 187 | A2 | 9/2001 |
| EP | 1 736 438 | A2 | 12/2006 |
| EP | 1 816 102 | A2 | 8/2007 |
| WO | 99/02471 | A1 | 1/1999 |

OTHER PUBLICATIONS

Shin Heungsoo; Separation of a Binary Gas Mixture by Pressure Swing Adsorption: Comparison of Different PSA Cycles; Adsorption 1995 Kluwer Academic Publishers, Dordrecht, Netherlands; vol. 1, NR. 4; 1995; pp. 321-333; XP002464015.

Ding, Y., "Adsorption-Enhanced Steam Methane Reforming", Chem. Eng. Sci. 55, (2000) pp. 3929-3940.

Balasubramanian, B., "Hydrogen from Methane in a Single-Step Process," Chem. Eng. Sci. 54 (1999) pp. 3543-3552.

Brun-Tsekhovoi, A. R., et al., "The Process of Catalytic Stream-Reforming of Hydrocarbons in the Presence of Carbon Dioxide Acceptor," Hydrogen Energy Progress VII, Proceedings of the 7th World Hydrogen Energy Conference, Moscow (vol. 2, 1988), pp. 885-900.

Zang, Z. C., et al., "Hydrogen Production from Methane and Water by Lattice Oxygen Transfer with $Ce_{0.70}Zr_{0.25}Tb_{0.05}O_{2-x}$," J. Alloys and Compounds, 323-324 (2001), pp. 97-101.

Nakahara, et al., "Synthesis and crystal structure of $(Sr_{1-x}Ca_x)_2FeMnO_y$ (x=0-1.0)," Elsevier Science B.V. Materials Letters, 30, (Feb. 1997) pp. 163-167.

Vidyasagar, K., et al., "A Convenient Route for the Synthesis of Complex Metal Oxides Employing Solid-Solution Precursors," Inorg. Chem., 1984 (23), 1206-1210.

U.S. Appl. No. 11/165,731, filed Jun. 24, 2005, Pez, et al.

U.S. Appl. No. 11/165,720, filed Jun. 24, 2005, Pez, et al.

Quinn, et al U.S. Appl. No. 11/737,942, filed Apr. 20, 2007.

Aihara, M., et al; "Development of Porous Solid Reactant for Thermal-Energy Storage and Temperature Upgrade using Carbonation/Decarbonation Reaction"; Applied Energy; 2001; pp. 225-238.

Hufton, J., et al. "Sorption Enhanced Reaction Process (SERP) for the Production of Hydrogen", Air Products and Chemicals, Inc., Allentown, PA 18195, Proceedings of the 2000 Hydrogen Program Review, NREL/CP-570-28890, pp. 1-12.

* cited by examiner

Segment

| Vessel | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| 1 | Production | | | | | B/RD1 | R2 | | | | | | | | | | | | | R3/RP | |
| 2 | R2 | | | R3/RP | | B/RD1 | R2 | Production | | | | | | | | | | | | | |
| 3 | R2 | | | | | | | | R3/RP | | B/RD1 | R2 | Production | | | | | | | | |
| 4 | B/RD1 | R2 | | | | | | | | | | | | R3/RP | | B/RD1 | R2 | | Production | | |

Key
R1 = Oxygen-lean regeneration
R2 = Oxygen-rich regeneration
R3 = Oxygen-lean regeneration
BD = Blowdown
RP = Repressurization

*FIG. 2*

REGENERATION OF COMPLEX METAL OXIDES FOR THE PRODUCTION OF HYDROGEN

CROSS-REFERENCE TO RELATED APPLICATIONS

This patent application is related to U.S. patent application Ser. No. 11/339,806, entitled "Hydrogen Production Process with Regenerant Recycle," contemporaneously filed on 25 Jan. 2006, now U.S. Pat. No. 7,591,992.

BACKGROUND OF THE INVENTION

Numerous methods for the production of hydrogen gas are known in the art. The production of industrial-scale volumes of hydrogen is typically accomplished by application of the steam-methane reforming process, which entails the catalytic reforming of natural gas with steam at elevated temperatures (800-900° C.). This process yields a crude synthesis gas, which is a mixture of hydrogen, carbon monoxide, and carbon dioxide, and the crude synthesis gas is further reacted in a catalytic water-gas shift conversion step to convert carbon monoxide and water to additional hydrogen and carbon dioxide. The shifted synthesis gas is purified to yield a final hydrogen product containing greater than 99 volume % hydrogen.

An alternative process for the production of hydrogen is the partial oxidation of methane to form synthesis gas, which is subsequently shifted if necessary and purified by pressure swing adsorption (PSA). Partial oxidation is known to be highly exothermic. Another alternative process to generate synthesis gas for hydrogen production is autothermal reforming, which is essentially a thermally balanced combination of the steam-methane reforming process and partial oxidation. One considerable drawback associated with these alternative processes is that partial oxidation requires a supply of high purity oxygen gas to the reaction system. Therefore, the use of these processes requires the additional step of separating air to produce the oxygen gas, and the air separation process increases the capital and operating costs of hydrogen production.

Other methods for hydrogen production are disclosed in U.S. Patent Application Publication No. 2002/0010220, and U.S. Pat. Nos. 5,827,496, 6,007,699, and 6,682,838.

U.S. patent application Ser. No. 11/165,731 discloses a new process for producing hydrogen comprising:
(a) providing a reactor containing a complex metal oxide and a steam-hydrocarbon reforming catalyst, wherein the complex metal oxide is represented by the formula:

$A_x B_y O_n$ wherein A represents at least one metallic element having an oxidation state ranging from +1 to +3, inclusive, wherein such metallic element is capable of forming a metal carbonate; x is a number from 1 to 10, inclusive; B represents at least one metallic element having an oxidation state ranging from +1 to +7, inclusive; y is a number from 1 to 10; inclusive and n represents a value such that the complex metal oxide is rendered electrically neutral;
(b) introducing a feed gas containing at least one hydrocarbon and steam into the reactor in a production step, reacting the at least one hydrocarbon and the steam in the presence of the complex metal oxide and the steam-hydrocarbon reforming catalyst under reaction conditions sufficient to form hydrogen and a spent complex metal oxide, and withdrawing from the reactor a product gas comprising hydrogen;
(c) terminating the introduction of the at least one hydrocarbon and depressurizing the reactor and optionally purging the reactor with a purge gas to displace combustible components from the reactor and withdrawing a purge gas effluent therefrom;
(d) regenerating the reactor in a regeneration step by reacting the spent mixed metal oxide and an oxygen source gas under reaction conditions sufficient to regenerate the complex mixed metal oxide;
(e) optionally purging the reactor with a purge gas;
(f) pressurizing the reactor by introducing a pressurizing gas into the reactor at pressure; and
(g) repeating (b) through (f) in a cyclic manner.

A in the complex metal oxide may represent at least one metallic element selected from the group consisting of elements of Groups 1, 2, and 3, and the Lanthanide elements of the IUPAC Periodic Table of the Elements; and B represents at least one metallic element selected from the group consisting of elements of Groups 4 to 15 of the IUPAC Periodic Table of the Elements. B in the complex metal oxide may be selected from the group consisting of vanadium, chromium, manganese, iron, cobalt, copper, nickel, and mixtures thereof.

The steam-hydrocarbon reforming catalyst may contain one or more components selected from the group consisting of nickel, cobalt, ruthenium, osmium, rhodium, palladium, platinum, iridium, oxides of the foregoing metals, and a catalyst support. The at least one hydrocarbon may be selected from aliphatic hydrocarbons having from 1 to 20 carbon atoms. The at least one hydrocarbon may be methane obtained as a component of natural gas. The molar ratio of steam to methane may range from 1.3:1 to 4:1, inclusive. Alternatively, the at least one hydrocarbon may be provided by pre-reformed natural gas.

The feed gas may comprise methane and the yield of hydrogen produced per mole of methane consumed may be within ±10% of the maximum yield of hydrogen that can be realized at thermoneutral conditions. The yield of hydrogen produced per mole of methane consumed may be within ±5% of the maximum yield of hydrogen that can be realized at thermoneutral conditions.

The production step may be characterized by a production temperature in the range of 350° C. to 9000 or in the range of 650° C. to 750° C., and a production pressure ranging from 1 to 100 atmospheres. The molar ratio of steam to the at least one hydrocarbon may range from 1:1 to 20:1.

As disclosed in U.S. patent application Ser. No. 11/165,731, the purge gas in the two purge steps may be selected from the group consisting of steam, nitrogen, or a mixture thereof. Purge gas in step (c) may be introduced to the reactor to reduce the concentration of combustible gases remaining in the reactor vessel to a safe level for the subsequent addition of air, which is used to regenerate the spent complex metal oxide material. Purge gas in step (e) may be introduced to the reactor to reduce the concentration of oxygen in the reactor vessel to a safe level for the subsequent addition of combustible pressurizing gas. Purging the reactor vessel may be desirable to prevent mixing of combustible gases with high concentrations of oxygen present in the regeneration gas within the reactor vessel, thereby diminishing the possibility for any uncontrolled energy release or temperature excursion.

According to U.S. patent application Ser. No. 11/165,731, the oxygen source for the regeneration step may be selected from the group consisting of air, oxygen, oxygen-depleted air, and mixtures thereof. The production step may be characterized by a production temperature and the regeneration step may be characterized by a regeneration temperature, wherein the regeneration temperature may be equal to or greater than the production temperature and wherein the difference between the regeneration temperature and the production temperature may be 100° C. or less. The regeneration step may be characterized by a regeneration temperature in the range of 450° C. to 900° C.

The production step may be characterized by a production pressure and the regeneration step may be characterized by a regeneration pressure, wherein the pressure of the regeneration step may be less than the pressure of the production step.

Elemental carbon may be deposited during the production step and may be oxidized and removed from the reactor in the regeneration step.

The pressurizing gas may be obtained from the group consisting of hot reactor feed, hot reactor effluent, steam, feed to a pressure swing adsorption system, and product gas. The process may further comprise, prior to purging the reactor in (c), depressurizing the reactor by withdrawing a depressurization gas therefrom. The feed gas may contain up to 25 volume % hydrogen. The feed gas may be pre-reformed natural gas. The process may further comprise cooling the product gas and removing non-hydrogen components therefrom in a pressure swing adsorption process to yield a high-purity hydrogen product comprising at least 99 volume % hydrogen.

According to U.S. patent application Ser. No. 11/165,731, the process may further comprise providing at least one additional reactor containing the complex metal oxide and the steam-hydrocarbon reforming catalyst, and operating the at least one additional reactor by carrying out steps (b) through (f) such that each of the reactors proceeds through the production step (b) during a different time period. A portion of the product gas from the production step may be retained and introduced into the reactor with the feed gas in a succeeding production step.

It has been discovered by the present inventors that purging the complex metal oxide with nitrogen, as disclosed in U.S. patent application Ser. No. 11/165,731, decreases the $CO_2$ retention capacity of the complex metal oxide over time. It would be desirable to retain the $CO_2$ retention capacity of the complex metal oxide.

While purging with nitrogen may negatively affect the $CO_2$ retention capacity of the complex metal oxide, it would still be desirable to eliminate the possibility for any uncontrolled energy release or unacceptable temperature excursion.

As hydrogen production is energy intensive, it would be desirable to increase the energy efficiency of the hydrogen production process that uses complex metal oxides. Purging with steam and/or nitrogen may decrease the energy efficiency of the process.

Known processes for the generation of hydrogen gas from hydrocarbons thus have associated drawbacks and limitations. There is a need in the field of hydrogen generation for improved process technology for the generation of hydrogen gas by the reaction of methane or other hydrocarbons with steam without certain of the limitations associated with known processes. This need is addressed by the embodiments of the present invention described below and defined by the claims that follow.

BRIEF SUMMARY OF THE INVENTION

The present invention relates to a process for producing a hydrogen-containing gas. The process comprises introducing a hydrocarbon feed gas and steam into a reaction vessel that contains at least one complex metal oxide and at least one steam-hydrocarbon reforming catalyst thereby forming a combustible gas mixture comprising hydrogen in the reaction vessel, introducing at least one reaction vessel void volume of a regeneration gas comprising greater than 0.1 volume % oxygen up to and including 2 volume % oxygen into the reaction vessel, and displacing at least a portion of the combustible gas mixture from the reaction vessel with the regeneration gas. The at least one complex metal oxide may comprise Ca, Mn, and/or Fe. The regeneration gas may comprise at least a portion of a regeneration effluent gas from the reaction vessel (i.e. recycle) or another reaction vessel. The regeneration gas may be formed by blending regeneration effluent gas with an oxygen-containing gas (e.g. air).

The process according to the invention may comprise one or more of the following characteristics, taken alone or in any possible technical combinations.

The inventive process may further comprise withdrawing a regeneration effluent gas comprising at least 50 ppm oxygen from the reaction vessel when the regeneration effluent gas comprises a portion of the regeneration gas.

The inventive process may comprise a step for introducing another regeneration gas comprising 2 volume % to 21 volume % oxygen into the reaction vessel. This other regeneration gas may comprise at least a portion of a regeneration effluent gas from the reaction vessel (i.e. recycle) or another reaction vessel and may be formed by blending regeneration effluent gas with an oxygen-containing gas (e.g. air).

The inventive process may comprise a step for introducing yet another regeneration gas comprising 0.1 volume % up to and including 2 volume % oxygen into the reaction vessel and displacing at least a portion of the higher oxygen concentration regeneration gas. This regeneration gas may comprise at least a portion of a regeneration effluent gas from the reaction vessel (i.e. recycle) or another reaction vessel and may be formed by blending regeneration effluent gas with an oxygen-containing gas (e.g. air).

The inventive process may comprise chemically adsorbing carbon dioxide to form $CaCO_3$ during at least a portion of the step of introducing the hydrocarbon feed gas.

BRIEF DESCRIPTION OF SEVERAL VIEWS OF THE DRAWINGS

FIG. 2 is a cycle schedule for a system having four reaction vessels.

DETAILED DESCRIPTION OF THE INVENTION

Figure 1:
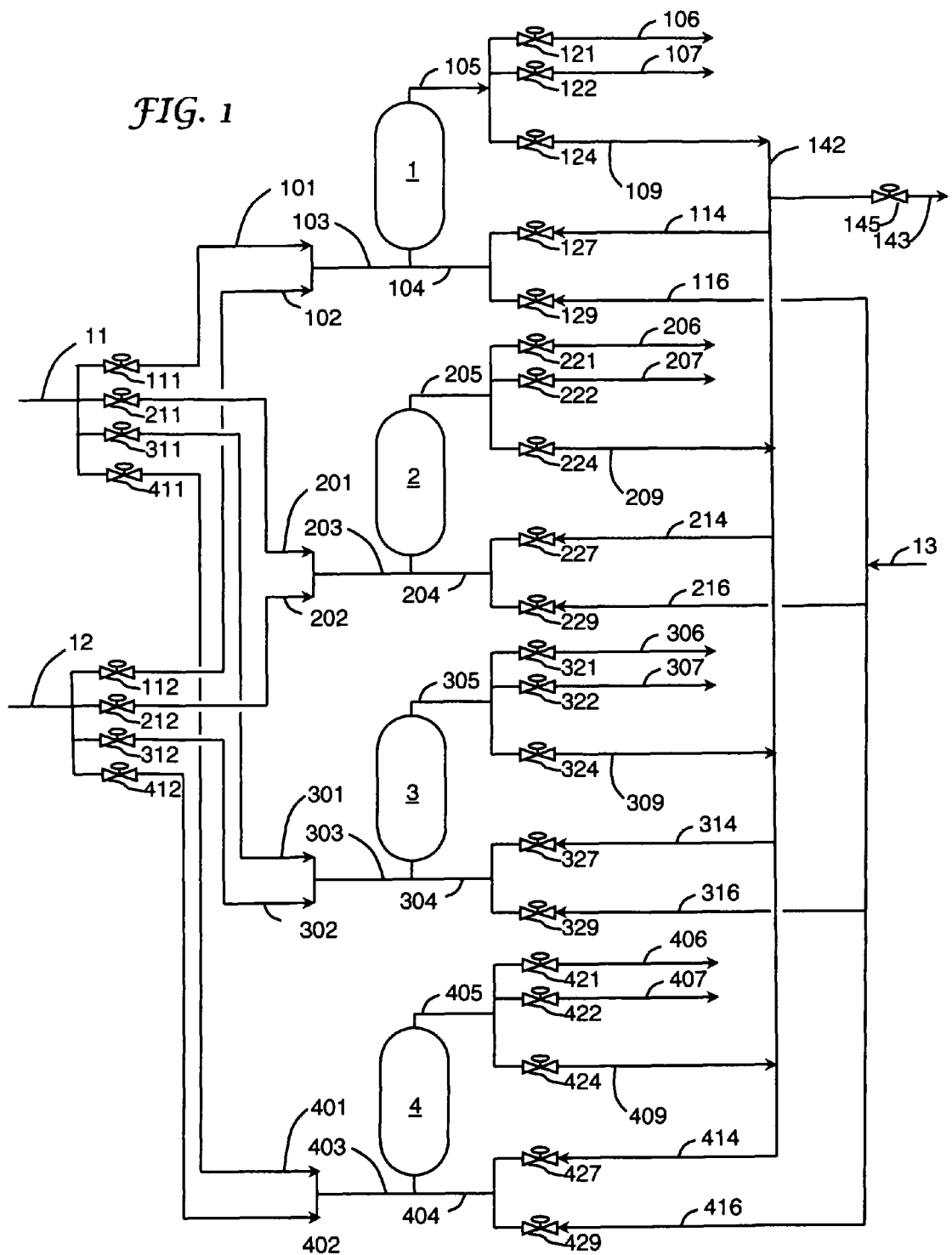
FIG. 1 is a schematic flow diagram of an exemplary process for the generation of hydrogen utilizing complex metal oxides in combination with steam-methane reforming catalyst in accordance with the present invention.

Embodiments of the present invention relate to a process for generating hydrogen by the reaction of one or more gaseous hydrocarbons with gaseous water, i.e., steam. In an embodiment of the invention, a process for producing a hydrogen-containing gas comprises the steps of (a) introducing a hydrocarbon feed gas and steam into a first reaction vessel containing at least one complex metal oxide and at least one steam-hydrocarbon reforming catalyst for a period thereby forming a combustible gas mixture comprising hydrogen in the first reaction vessel; (b) introducing at least one reaction vessel void volume of a first regeneration gas comprising greater than 0.1 volume % up to and including 2 volume % oxygen into the first reaction vessel; and (c) displacing at least a portion of the combustible gas mixture from the first reaction vessel with the first regeneration gas.

The hydrocarbon feed gas may comprise methane and the steam-hydrocarbon reforming catalyst may be a steam-methane reforming catalyst. The term "complex metal oxide" is defined herein as a chemical compound comprising oxygen and two or more elements that are regarded as metals in their pure unoxidized state at normal ambient conditions. Complex metal oxides may include, for example, ternary or quaternary metal oxides comprising two and three metallic elements, respectively, in combination with oxygen. In contrast to a complex metal oxide, a simple metal oxide is a combination of only one element and oxygen and is usually referred to as a binary oxide. This distinction between complex and simple oxides is further explained with specific illustrations in *Comprehensive Inorganic Chemistry*, Vol. 2, pp. 729-735, Pergamon Press (1975).

In an embodiment of the present invention, an autothermal process is used for producing hydrogen directly in a single reaction zone or reactor bed by the reaction of one or more hydrocarbons with steam. The one or more hydrocarbons may comprise methane.

The term "autothermal process" is used herein to describe a process comprising a plurality of chemical reactions, at least one of which is exothermic and at least one of which is endothermic, wherein some or all of the energy requirements of the endothermic reaction or reactions are supplied by the exothermic reaction or reactions. Thus, once the chemical reactions of the process have been initiated, minimal additional energy input is required to sustain the reactions, and the process is essentially thermally self-sustaining. In a first or reaction step of the process, the endothermic heat required for the catalytic reforming reaction of one or more hydrocarbons with water is provided by the exothermic heat of partial oxidation of the one or more hydrocarbons with oxygen being derived from the complex metal oxide and by the usually exothermic reaction of carbon dioxide with the complex metal oxide. In a second or regeneration step of the process, the regeneration of the complex metal oxide is affected by the reaction of oxygen with the spent complex metal oxide and the liberation of carbon dioxide taken up by the complex metal oxide in the first step, and this regeneration step also is an autothermal process.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

In practice, it may be desirable to carry out the production and regeneration steps under conditions that are slightly net exothermic to compensate for any losses of heat during the process. Such heat losses may result in small temperature changes as determined by the respective enthalpies of the reaction steps and the heat capacities of the reactor beds. However, the closer the overall process approaches a thermoneutral process, the greater the yield of hydrogen and the more energy efficient the production of the hydrogen product.

Thus in the production step (a) of the process described herein, the endothermic reaction of one or more hydrocarbons with steam is balanced by the exothermic partial oxidation of the one or more hydrocarbons and the usually exothermic reaction of carbon dioxide with the mixed metal oxide. At steady-state conditions, the desirable autothermal process does not require that heat energy be supplied to the reactors to sustain the reaction after startup. However, during startup, an initial quantity of imported heat energy may be required for the generation of steam for the reaction. This heat energy may be supplied by any suitable method such as, for example, the use of a reaction exotherm or combustion of a fuel material. The autothermal, and desirably slightly exothermic, process provides for a highly efficient generation of hydrogen from hydrocarbons and steam. In addition, the process described herein reduces the need for high heat transfer surface area and special alloys that are required in conventional steam-hydrocarbon reforming reactor systems, and thus may lead to simpler and less costly reformer reactors.

In the production step (a) of the process, defined equivalently as the reaction, or synthesis step, a hydrocarbon feed gas and steam are introduced into a reactor. Suitable reactors may be packed bed catalytic reactors, fluidized bed reactors, or any other reactor configuration. The hydrocarbon feed gas may comprise any hydrocarbons which are capable of catalyzed reaction with steam to form hydrogen. The hydrocarbons may be selected from aliphatic hydrocarbons having from 1 to 20 carbon atoms, and advantageously are selected from aliphatic hydrocarbons having from 1 to 6 carbon atoms. Desirably, the hydrocarbon feed gas may be selected from methane, natural gas, propane, or a mixture of predominantly $C_1$ to $C_4$ aliphatic hydrocarbons. The process is affected by passing a gaseous feed mixture containing steam and one or more hydrocarbons through a reaction bed which comprises a complex metal oxide material and a steam-hydrocarbon reforming process catalyst, the reaction bed being maintained at an elevated temperature.

A desirable gaseous feed mixture comprises steam and methane. The methane in the steam/methane gaseous mixture may be obtained from any suitable source, and may be, for example, natural gas from which sulfur compounds have been removed. It may be advantageous to include a low level of hydrogen, e.g. ~0.5 mole % or more as a product recycle to the feed stream in order to assist in the reduction/activation of the catalyst and possibly to reduce the likelihood of carbon deposition, particularly where unreformed natural gas or $C_2$ and higher hydrocarbons are present in the hydrocarbon feed gas.

The molar ratio of steam to hydrocarbon typically ranges from about 1:1 to about 20:1. The minimum or theoretical steam to hydrocarbon ratio depends on the composition of the hydrocarbon. In an embodiment, the hydrocarbon is propane, and the molar ratio of steam to propane may be from about 4:1 to about 10:1. In another embodiment, the hydrocarbon is methane; the molar ratio of steam to methane may be between 1.3:1 and 4:1, and more specifically this ratio may be between 1.3:1 and 2:1.

In another embodiment, the gaseous feed mixture may be a mixture of adiabatically pre-reformed natural gas and steam. The adiabatic pre-reforming process is affected by heating natural gas to a temperature of about 500° C. and passing the heated gas through an adiabatic nickel catalyst bed. Natural gas typically contains about 5% of heavy hydrocarbon fractions, wherein the term "heavy" is understood to mean fractions containing two or more carbon atoms. The heavy fractions are typically more reactive than methane, and catalytically reformed to yield carbon dioxide, hydrogen and low levels of carbon monoxide. The resulting gas mixture therefore contains a mixture of methane, carbon dioxide, steam, carbon monoxide, and hydrogen. The pre-reforming reactions typically are endothermic, and because the reaction usually proceeds adiabatically, the temperature of the resulting gas mixture decreases. Typically, the temperature of the gas mixture is reduced to about 450° C. after pre-reforming.

In another embodiment, the gaseous feed mixture may be a mixture of pre-reformed natural gas and steam. The pre-reforming process is affected by heating natural gas to a temperature of 500° C. or higher and passing the heated gas through an adiabatic nickel catalyst bed or convectively heated bed of nickel catalyst. The heavy fractions are catalytically reformed to yield carbon dioxide, hydrogen and low levels of carbon monoxide. The resulting gas mixture therefore contains a mixture of methane, carbon dioxide, steam, carbon monoxide, and hydrogen.

The use of pre-reformed natural gas instead of untreated natural gas has associated advantages. First, the pre-reforming process generates some hydrogen, which is useful for chemically reducing to an active state the catalyst of the subsequent steam-methane reforming reaction. Second, the removal of the heavy hydrocarbon fractions reduces the potential for carbon deposition on the steam-methane reforming catalyst. The use of pre-reforming extends the life of the catalyst, since carbon deposition ultimately leads to the deactivation of the catalyst.

The complex metal oxide material and a steam-hydrocarbon reforming process catalyst may be combined prior to loading in the reaction bed. Combining the complex metal oxide and the steam-hydrocarbon reforming catalyst may be effected in any suitable manner, for example, by mixing the steam-hydrocarbon reforming catalyst with the complex metal oxide material or impregnating the complex metal oxide material with the steam-hydrocarbon reforming catalyst. Alternatively or additionally, the complex metal oxide itself may promote steam-hydrocarbon reforming when component B (see below) of the oxide is reduced to its metallic or zero oxidation state during the hydrogen synthesis reaction. Examples of component B include cobalt and nickel that exist in a positive oxidation state as part of the structure of the complex metal oxide and may be reduced at reaction conditions to metallic cobalt and metallic nickel, in which form they may be active as steam-hydrocarbon reforming catalysts. In this case, the complex metal oxide functions as a precursor to the steam-hydrocarbon reforming catalyst, as an oxygen source, and as a carbon dioxide acceptor. The steam-hydrocarbon reforming catalyst may be physically mixed with the complex metal oxide material as described above. Typically, the reaction bed is maintained at an elevated temperature, and the reforming reactions may be effected in the range of about 350° C. to about 900° C. and more specifically in the range of about 600° C. to about 750° C.

Suitable complex metal oxide materials for use in the embodiments of the present invention include oxides comprising two or more metallic elements that may be represented with the general formula $$A_xB_yO_n$$

wherein A is at least one metallic element having an oxidation state ranging from +1 to +3, inclusive, wherein the metallic element is capable of forming a metal carbonate; x is a number from 1 to 10, inclusive; B is at least one metallic element having an oxidation state ranging from +1 to +7 inclusive, wherein B can be the same element in at least two different oxidation states; y is a number from 1 to 10 inclusive; and n represents a value such that the complex metal oxide is rendered electrically neutral. The carbonate of the metallic element A may be formed by reaction of an oxide of the element with carbon dioxide wherein the oxide of the element may be formed by reaction of the element with oxygen of water.

In an embodiment, the complex metal oxide material of formula $A_xB_yO_n$ is a composition wherein A is at least one metallic element selected from the group consisting of elements of Groups 1, 2 and 3, and the Lanthanide elements of the IUPAC Periodic Table of the Elements, and B is at least one metallic element selected from the group consisting of elements of Groups 4 to 15 of the IUPAC Periodic Table of the Elements. For example, B may be selected from the group consisting of vanadium, chromium, manganese, iron, cobalt, copper, nickel, and mixtures thereof. Component B may comprise one or more metallic elements, each of which can form oxides having at least two different valencies. During the hydrogen gas production step, at least one of the metallic species of component B may be reduced to the metallic zero valence state. Metallic species of component B which may be reduced to the metallic state during the hydrogen production step include, but are not limited to, iron, cobalt, nickel, and copper.

In an embodiment, the complex metal oxide material of formula $A_xB_yO_n$ is a composition wherein A is calcium; x is a number from 1 to 2, inclusive; B is at least one of iron and manganese; y is a number form 1 to 2, inclusive; and n represents a value such that the complex metal oxide is rendered electrically neutral.

Suitable complex metal oxide materials for use in the embodiments of the present invention include oxides comprising two or more metallic elements that may also be represented with the general formula $Ca_2Mn_yFe_zO_n$ wherein $0 \leq y \leq 2$, $0 \leq z \leq 2$, $y+z=2$, and $3 \leq n \leq 7$. Suitable complex metal oxide materials may include $Ca_2MnFeO_5$, $Ca_2Mn_2O_5$, and/or $Ca_2Fe_2O_4$.

Suitable steam-hydrocarbon reforming process catalysts include any materials effective for the reforming of methane or higher hydrocarbons with steam to produce hydrogen. These materials may include, for example, any of nickel, cobalt, the platinum group metals (i.e., ruthenium, osmium, rhodium, palladium, platinum, and iridium), and oxides of the foregoing metals. The materials may be supported on zirconia, alumina, or other suitable supports.

During the production step (a), the gaseous reactants, i.e., steam and a hydrocarbon feed gas, are fed through a reaction bed which comprises at least one complex metal oxide material and a conventional steam-hydrocarbon reforming process catalyst, the reaction vessel bed being maintained at an elevated temperature. A product of relatively pure hydrogen, i.e., greater than about 90% pure, is obtained until the complex metal oxide material loses its ability to chemically adsorb carbon dioxide. Typically, the reactor is prepared for the present process by preparing a physical mixture of complex metal oxide and steam-hydrocarbon reforming catalyst and loading the mixture as a packed bed in the reactor. A source of steam is mixed in the desired proportion with hydrocarbon feed gas, the mixture is fed into the reactor, and the product gases are removed from the reactor. The composition of the outlet gases in this synthesis step may be monitored by standard techniques such as in-line IR spectro-scopy. Completion of the synthesis step may be indicated by a measured increase in the level of carbon dioxide or hydrocarbon in the reactor effluent or the process may be sequenced according to a time schedule. The regeneration of the complex metal oxide may then be initiated after first terminating the flow of the hydrocarbon feed gas. After terminating the hydrocarbon feed gas flow, the reaction vessel may be depressurized to a pressure below the reaction pressure, down to and including about atmospheric pressure, in a blowdown step. However, the reaction vessel will still contain residual combustible gases.

Complex metal oxide may be regenerated by passing hot air over the bed of spent material. Passing hot air through the bed of spent complex metal oxide material immediately after the production step is not safe because of the presence of combustible gases e.g. hydrogen and/or methane, in the reaction vessel. Therefore earlier disclosures suggest purging the reaction vessel prior to regenerating the spent complex metal oxide material with air.

While earlier disclosures suggest using nitrogen, inert gas, and/or steam to purge the reaction vessel thereby reducing the concentration of combustible gases in the reaction vessel, inventors have discovered that purging with a gas containing less than about 0.1 volume % oxygen decreases the carbon dioxide retention capacity of the complex metal oxide in subsequent production steps.

Therefore, according to the inventive process, at least one reaction vessel void volume of a first regeneration gas comprising greater than 0.1 volume % up to and including 2 volume % oxygen is introduced into the first reaction vessel thereby displacing at least a portion of the residual combustible gases in the first reaction vessel. Regeneration gas comprising greater than 0.1 volume % up to and including 2 volume % oxygen is introduced to the reaction vessel to reduce the concentration of combustible gases in the reaction vessel to a safe level thereby diminishing the possibility for any uncontrolled energy release or temperature excursion.

The reaction vessel void volume of the first regeneration gas is the reaction vessel volume less any volume occupied by solid materials such as the complex metal oxide and reforming catalyst evaluated at the time-averaged temperature and pressure of the first regeneration gas during the step.

In an embodiment of the invention, the complex metal oxide is regenerated with the first regeneration gas comprising greater than 0.1 volume % oxygen up to and including 2 volume % oxygen throughout the entire period of regeneration. Surprisingly, it has been found by the inventors that the combustible gases in the reaction vessel may be displaced and the spent complex metal oxide may be regenerated effectively without losing carbon dioxide sorption capacity in subsequent production steps by using a regeneration gas comprising greater than 0.1 volume % up to and including 2 volume % oxygen. In case the oxygen in the regeneration gas reacts with combustible gases in the reaction vessel, an upper limit of 2 volume % oxygen in the regeneration gas was calculated to limit the temperature rise in the reaction vessel to an acceptable level.

In an embodiment of the invention, the process comprises withdrawing a regeneration gas effluent gas comprising at least 50 ppm oxygen from the reaction vessel when the regeneration gas effluent comprises a portion of the regeneration gas. When regeneration gas is initially introduced to the reaction vessel, the effluent will comprise combustible gas mixture. Eventually the effluent will comprise components of the regeneration gas. Oxygen in the regeneration gas may be consumed by reaction with the metal oxide and/or combustibles in the reaction vessel. Therefore, when the effluent comprises an early portion of the regeneration gas, the oxygen concentration may be diminished. So as to minimize any adverse effects on metal oxide, it may be desirable to provide a sufficient space velocity of the regeneration gas so that the metal oxide near the exit portion of the reaction vessel is exposed to at least 50 ppm oxygen when the effluent gas comprises a portion of the regeneration gas. Ahead of the regeneration gas front, the metal oxide is exposed to the combustible gas mixture, which should not have any adverse effect on the metal oxide.

In an embodiment of the invention, a first regeneration gas comprising greater than 0.1 volume % oxygen up to and including 2 volume % oxygen is introduced into the reaction vessel for a portion of the regeneration period and a second regeneration gas comprising 2 to 21 volume % oxygen is introduced into the reaction vessel for another portion of the regeneration period, thereby further regenerating the spent complex metal oxide.

According to an embodiment of the invention, prior to introducing hydrocarbon feed gas back into the reaction vessel for a production step, at least one reaction vessel void volume of a third regeneration gas comprising greater than 0.1 volume % oxygen up to and including 2 volume % oxygen is introduced into the reaction vessel, thereby displacing at least a portion of the second regeneration gas from the reaction vessel. This is done to avoid mixing hydrocarbon feed gas with high concentrations of oxygen within the reaction vessel.

The regenerated complex metal oxide typically has very similar activity to the original complex metal oxide. With repeated cycling, however, the regenerated complex metal oxide may have a slightly different chemical composition from the original complex metal oxide. Nevertheless, the regenerated complex metal oxide is sufficient for use in the process and can be repeatedly recycled.

In the regeneration step of the process the complex metal oxide is regenerated with an oxygen-containing gas and the production step is repeated. These two process steps can be integrated into a continuous cyclic process for generating hydrogen.

While the overall process of the embodiments of the present invention can be described in terms of two cyclic steps, the process may involve a plurality of steps. Thus, a plurality of parallel reaction vessels containing reaction beds of complex metal oxide and steam-hydrocarbon reforming catalyst may be utilized, and the reaction vessels may be operated in a cyclic manner. For example, one or more reaction vessels may be operated in the hydrogen production step while simultaneously one or more other reaction vessels are operated in the regeneration step in preparation for a subsequent hydrogen production step.

Each reactor vessel may operate in the following exemplary sequence of steps.

(a) A production step in which a feed mixture of hydrocarbon and steam is introduced into the reaction bed at the appropriate temperature and pressure. The reactor bed may include preheat and post cool zones. The reaction bed contains a mixture of complex metal oxide and steam-hydrocarbon reforming catalyst. The feed mixture is reacted in the presence of the complex metal oxide and steam-hydrocarbon reforming catalyst in an autothermal reaction to yield hydrogen and carbon dioxide as the major products. The carbon dioxide reacts with and is retained by the complex metal oxide, and the reactor effluent contains a mixture of hydrogen, steam, unreacted methane and low levels of carbon dioxide and carbon monoxide. The effluent mixture is at an elevated temperature and pressure. The reaction is carried out until the complex metal oxide in the bed is reduced, at which time the bed is saturated with captured carbon dioxide and depleted of oxygen. The production step may be characterized by a production temperature that is defined as the time-averaged temperature of the reactor effluent during the production step. The production step may be characterized by a production pressure defined as the time-averaged pressure of the reactor effluent stream.

(b) An oxygen-lean gas regeneration step in which residual combustible gases in the reaction vessel are displaced by regeneration gas having an oxygen concentration of greater than 0.1 volume % oxygen up to and including 2 volume % oxygen and in which the reaction bed is at least partially regenerated. Regeneration liberates carbon dioxide and recharges the bed with oxygen so that the bed is prepared to undergo the production step. When the oxygen-lean regeneration gas comprises steam, the process effluent may consist largely of steam and hydrogen, which can be recycled to the production step. The oxygen-lean regeneration gas pressure may be close to atmospheric pressure; however, if the oxygen-lean regeneration gas comprises mainly steam, it can be at either low or high pressure, since high pressure steam is used as a component of the feed mixture for other beds in the production step. For oxygen-lean gas regeneration at low pressure, the oxygen-lean gas regeneration step is preceded by a pressure reduction or blowdown step. For oxygen-lean gas regeneration at high pressure, the oxygen-lean gas regeneration step precedes the depressurization step. The oxygen-lean gas regeneration step may be characterized by a regeneration temperature that is defined as the time-averaged temperature of the reactor effluent during the oxygen-lean gas regeneration step.

(c) (optional) An oxygen-rich gas regeneration step in which the reaction bed is regenerated with elevated temperature regeneration gas comprising 2 to 21 volume % oxygen at ambient pressure. The bed should be sufficiently depleted of combustible gases to allow the safe introduction of oxygen-rich gas. The oxygen-rich gas regeneration step further liberates carbon dioxide and recharges the bed with oxygen so that the bed is prepared to undergo a subsequent production step. The oxygen-rich gas regeneration step may be characterized by a regeneration temperature that is defined as the time-averaged temperature of the reactor effluent during the oxygen-rich gas regeneration step.

(d) A repressurization step in which the regenerated bed is pressurized to the reaction pressure. Repressurization may be effected by using, for example, the high pressure steam and hydrocarbon feed mixture. Alternatively, repressurization may be effected by a hot high pressure reactor effluent from another bed undergoing the reaction step. It can also be raw synthesis gas feeding the PSA (Pressure Swing Adsorption) system. Alternatively, the repressurization gas can be high pressure steam. Optionally, the repressurization step is preceded by introduction of an oxygen-lean regeneration gas to reduce the oxygen concentration in the reaction vessel prior to introduction of hydrogen and/or hydrocarbon feed gas.

When the feed is natural gas or a $C_2$ to $C_4$ heavier hydrocarbon, or when a low molar steam/carbon ratio feed stream is used, there is the possibility of some carbon deposition in the reactor. This would be a serious issue in conventional reforming but not in the present process, since in this process the carbon that is formed will undergo gasification via oxidation to CO and $CO_2$ in the subsequent oxygen-lean or oxygen-lean followed by oxygen-rich regeneration step.

The first regeneration gas, which is an oxygen-lean regeneration gas comprising greater than 0.1 volume % oxygen up to and including 2 volume % oxygen, may comprise at least one of regeneration effluent gas, air, products of combustion, industrial nitrogen, and a vent stream from an air separation unit. Industrial nitrogen may be supplied by an on-site air separation unit and/or liquid nitrogen stored in tanks. Regeneration effluent gas is the resulting gas exiting or removed from a reaction vessel during a regeneration step. Products of combustion may be formed in a separate reaction chamber or furnace with an excess amount of air so as to provide an oxygen-lean regeneration gas. Various gas sources may be blended to form the first regeneration gas and the first regeneration gas composition may vary over time, but still maintaining an oxygen concentration of greater than 0.1 volume % up to and including 2 volume %.

The optional second regeneration gas, which is an oxygen-rich regeneration gas comprising 2 to 21 volume % oxygen, may comprise at least one of regeneration effluent gas, air, products of combustion, industrial nitrogen, and a vent stream from an air separation unit. Alternatively, a large excess of air may be co-fired with fuel to generate an oxygen-rich flue gas mix in a direct-firing process. Various gas sources may be blended to form the second regeneration gas and the second regeneration gas composition may vary over time, but still maintaining an oxygen concentration of 2 to 21 volume %.

The optional third regeneration gas, which is an oxygen-lean regeneration gas comprising greater than 0.1 volume % oxygen up to and including 2 volume % oxygen, may comprise at least one of regeneration effluent gas, air, products of combustion, industrial nitrogen, and a vent stream from an air separation unit. Various gas sources may be blended to form the third regeneration gas and the third regeneration gas composition may vary over time, but still maintaining an oxygen concentration of greater than 0.1 volume % up to and including 2 volume %.

The first regeneration gas and optionally the second and third regeneration gases are introduced into the reaction vessel to effect the regeneration of the complex metal oxide. The regeneration gases may be externally preheated by passing through a heat exchanger or heated by direct firing from a fixed heater to the regeneration temperature. The regeneration of the complex metal oxide may take place spontaneously with a minimal input or loss of heat, and may occur at about the same temperature as the synthesis step, i.e., at a temperature in the range of about 450° C. to about 900° C. More specifically, the temperature may be in the range of about 600° C. to about 800° C. Typically, the regeneration of the complex metal oxide may be affected at a temperature up to about 150° C. above the temperature of the hydrogen production step. More specifically, the regeneration step may be affected at a temperature up to about 100° C. above the temperature of the hydrogen production step, and possibly at a temperature up to about 50° C. above the temperature of the hydrogen production step. The close correlation between the temperatures of the regeneration step and the production step that is possible in this process leads to improved catalyst stability and also reduces or eliminates the need for providing external heating during the reaction and regeneration steps.

The generation of hydrogen from hydrocarbons and water according to an exemplary embodiment of the present invention using a complex metal oxide and a steam hydrocarbon reforming catalyst is illustrated in the schematic process diagram of FIG. 1 and cycle schedule FIG. 2. The exemplary embodiment of the present invention illustrates the present invention but does not limit the invention to any of the specific details described therein.

The exemplary embodiment shows four hydrogen reaction vessels, 1, 2, 3, and 4. Each hydrogen reaction vessel may be operated in the following exemplary sequence of steps:

(a) A production step—in which a feed mixture of hydrocarbon and steam is introduced into the reaction vessel at an appropriate temperature and pressure. The reactor bed may include preheat and post cooling zones. The reaction vessel contains a mixture of complex metal oxide and steam-hydrocarbon reforming catalyst. The gaseous feed mixture reacts in the presence of the complex metal oxide and steam-hydrocarbon reforming catalyst in an autothermal reaction to yield hydrogen and a "spent" solid comprising metal carbonate and reduced oxide. The reactor effluent contains a mixture of hydrogen and steam, along with a small amount of reaction products including carbon dioxide, carbon monoxide, and unreacted methane. The effluent mixture is at elevated temperatures and pressure. The reaction is carried out until much of the complex metal oxide in the bed is reduced, at which time the bed is saturated with carbon dioxide and depleted of oxygen. The temperatures in the reactor and the reactor effluent temperature may vary with time during the hydrogen production step. The hydrogen production step may be characterized by a production temperature that is defined as the time-averaged temperature of the reactor effluent during the production step. The production step may be characterized by a production pressure defined as the time-averaged pressure of the reactor effluent stream.

(b) An oxygen-lean regeneration step (abbreviated R1 in FIG. 2) —in which the at least partially saturated or spent bed is at least partially regenerated with at least one reaction vessel void volume of an oxygen-lean regeneration gas. The oxygen-lean regeneration gas pressure may be close to atmospheric pressure. Then the oxygen-lean regeneration step is preceded by a pressure reduction or blowdown step (abbreviated BD in FIG. 2). For oxygen-lean gas regeneration at high pressure, the oxygen-lean gas regeneration step precedes the depressurization or blowdown step.

(c) An oxygen-rich gas regeneration step—in which the reaction bed is regenerated with elevated temperature oxygen-rich gas comprising 2 to 21% oxygen, at ambient pressure. The bed should be sufficiently depleted of combustible gases to allow the safe introduction of oxygen-rich regeneration gas. The temperatures in the hydrogen reaction vessel and the reaction vessel effluent temperature may vary with time during the oxygen-rich gas regeneration step. The oxygen concentration of the effluent leaving the reaction vessel may vary with time during the oxygen-rich gas regeneration step. The regeneration step may be characterized by a regeneration temperature that is defined as the time-averaged temperature of the reactor effluent during the regeneration step.

(d) A second oxygen-lean regeneration step (abbreviated R3 in FIG. 2)—in which the oxygen concentration of the gases in the reaction vessel is reduced by introducing at least one reaction vessel void volume of oxygen-lean regeneration gas. The oxygen-lean regeneration gas pressure may be close to atmospheric pressure.

(e) A repressurization step (abbreviated RP in FIG. 2) —in which the regenerated bed is pressurized to the reaction pressure. Repressurization may be effected by using, for example, high pressure steam or a steam/hydrocarbon feed mixture.

Referring again to FIG. 1, a heated hydrocarbon-containing feed gas, for example, methane, natural gas, or pre-reformed natural gas, flows via conduit 11 at a pressure in the range of 1.379 to 5.516 MPa (200 to 800 psia) and a temperature in the range of about 200° C. to 250° C. The feed gas may be preheated in a heat exchanger (not shown). Feed gas flows through open valve 111 to conduit 101 and process steam flows via conduit 12 through open valve 112 to conduit 102. Feed gas is mixed with process steam to form a hydrocarbon-steam feed mixture which flows via conduit 103 to hydrogen reaction vessel 1. Hydrogen reaction vessels may be constructed by means and materials known in the art. When the hydrocarbon is methane or pre-reformed natural gas, the molar ratio of steam to hydrocarbon may be from about 1:1 to about 4:1, and typically may be about 2:1. The molar steam to carbon ratio may be higher, and may range up to about 20:1 for heavier hydrocarbons.

The steam-hydrocarbon mixture is introduced into a heat exchanger (not shown) and is further heated therein by heat exchange with a hot process stream. The steam-hydrocarbon mixture may be heated to a temperature in the range of about 350° C. to about 900° C., and typically may be in the range of about 600° C. to about 750° C. The heated mixture then is introduced via conduit 103 into reactor 1, which contains a bed containing a mixture of complex metal oxide material and a steam-hydrocarbon reforming catalyst. The feed mixture reacts in the bed to form primarily hydrogen and a spent solid comprising a reduced oxide-carbonate.

The inventory of chemically bound oxygen available as reactants, i.e., the oxygen associated with the complex metal oxide and steam reactants, may be adjusted in the reactor design so that the reaction product effluent stream leaves reactor 1 via conduit 105 at a time-averaged temperature between about 400° C. and about 750° C. The reaction product effluent stream flows through open valve 121 and via conduit 106 to a heat exchanger (not shown), where it is cooled to a temperature in the range of about 250° C. to about 350° C. by indirect heat exchange with an incoming steam-hydrocarbon mixture stream as earlier described. The cooled reaction product effluent stream exits a heat exchanger in heat exchange relationship with incoming feed gas (not shown) and is further cooled in heat exchangers and/or boilers to yield a further cooled reaction product effluent stream at a typical temperature of about 40° C.

The cooled reaction product stream may be further purified by pressure swing adsorption (PSA). Components removed from the hydrogen by the PSA system typically include carbon dioxide, water, methane and other unreacted hydrocarbons, and carbon monoxide, and these are withdrawn as waste gas during the blowdown and purge steps typically used in PSA process cycles. Any of the PSA cycles and systems known in the art may be used in the process described in this and other embodiments of the invention. The waste gas typically contains combustible components and may be used as fuel in the plant.

The mixture of complex metal oxide material and steam-hydrocarbon reforming catalyst in reactor 1 has a finite inventory of chemically bound oxygen and a finite chemisorption capacity for carbon dioxide as the reduced oxide-carbonate. Once either of these is exhausted, the purity and yield of hydrogen in the reaction product effluent stream leaving reactor 1 via conduit 105 and 106 will begin to decrease. The time at which this occurs can be determined by real-time analysis of the stream by any known analytical means, such as, for example, in-line gas chromatography, or by a pre-determined cycle time. At this point, reactor 1 is prepared for regeneration. The flow of feed gas and steam is stopped by closing valves 111 and 112. The flow of product gas is stopped by closing valve 121 and the vessel is depressurized by opening valve 122, allowing the blowdown gas to flow via conduit 107. The blowdown gas may be used as a fuel, for example in a boiler (not shown).

Oxygen-lean regeneration gas is introduced to reactor 1 to regenerate complex metal oxide and at least partially remove residual hydrogen and/or hydrocarbons from the reactor void volume. Oxygen-lean regeneration gas may be formed from effluent from another reaction vessel undergoing regeneration, blended with air, if necessary. Alternatively, steam may be blended with air to form oxygen-lean regeneration gas. In another alternative, nitrogen (not shown) may be blended with air to form oxygen-lean regeneration gas. Referring to FIG. 2, reactor 4 will be in a stage of regeneration and the oxygen concentration of effluent may be low such that the effluent of reactor 4 may be suitable as an oxygen-lean regeneration gas. Effluent from reaction vessel 4, leaving through conduit 405, will flow through open valve 424, through conduit 409, through conduit 142, through conduit 114, through open valve 127, through conduit 104 and into reaction vessel 1. Air may be blended with the effluent if necessary to provide an oxygen concentration of greater than 0.1 volume % up to and including 2 volume %. Air from conduit 13 will flow via conduit 116, through open valve 129, and blend with effluent in conduit 104 thereby forming the oxygen-lean regeneration gas. Regeneration gas effluent from reaction vessel 1 comprising residual hydrogen and/or hydrocarbons is removed via open valve 122 and conduit 107. The effluent gas may be used as a fuel, for example in a boiler (not shown).

After combustible gases have been removed from reaction vessel 1, valve 122 is closed and valve 124 is opened. Some regeneration gas effluent flows through valve 145 and conduit 143 to another part of the process to be used possibly as a fuel. Regeneration effluent gas leaves reaction vessel 1 via conduit 105, open valve 124 and conduit 109. From conduit 109, the effluent gas is blended with air and recycled back to the reaction vessel 1 in an oxygen-rich regeneration step. An in-line oxygen sensor or equivalent device (not shown) may be included in conduit 109 to measure the concentration of oxygen leaving vessel 1. The amount of air blended with the effluent gas may be controlled based on the oxygen concentration measured.

FIG. 1 shows an arrangement where feed, blowdown, purge, and regeneration gases all flow upward in the reaction vessel. Other arrangements of valves and conduits may allow one or more of these gases to flow downward in the reaction vessel. For example, the feed gas and regeneration gas may flow in opposite direction within the bed.

Oxygen-rich regeneration gas for reaction vessel 1 is formed by blending effluent gas with air. Air at about 0.103 to 0.345 MPa (15 to 50 psia) and 500° C. to 900° C. or about 700° C. to 800° C., is provided via conduit 13, through conduit 116, valve 129, conduit 104 blended with effluent from 114 via open valve 127 and introduced as oxygen-rich regeneration gas into reaction vessel 1. An in-line oxygen sensor or equivalent device (not shown) may be included in conduit 104 to measure the concentration of oxygen entering vessel 1 and used to control the amount of air blended via valve 129. The oxygen in the oxygen-rich regeneration gas regenerates the complex metal oxide material, and the regeneration gas desorbs the previously chemisorbed carbon dioxide. The carbon-dioxide-rich, oxygen-depleted regeneration effluent leaves the reactor via conduit 105 at a temperature in the range of about 600° C. to about 900° C. and typically from about 650° C. to about 750° C. The oxygen-depleted regeneration effluent then flows through open valve 124, conduit 109, and conduit 142. Some effluent is transferred through open valve 145, and conduit 143. From conduit 143, the gas may be introduced into various heat exchangers (not shown) to recover heat. Some effluent is recycled back to the reaction vessel 1 via open valve 127.

According to FIG. 2, carbon-dioxide-rich, oxygen-depleted regeneration effluent from reaction vessel 1 may be used oxygen-lean regeneration of reaction vessel 2. Carbon-dioxide-rich, oxygen-depleted regeneration effluent from reaction vessel 1 flows through conduit 142, conduit 214, open valve 227, conduit 204 and into reaction vessel 2. Oxygen-lean regeneration gas may be formed by blending regeneration effluent from reaction vessel 1 with air from conduit 216 via open valve 229.

Following the substantial regeneration of reactor 1 by re-oxidizing the complex metal oxide and removal of chemisorbed carbon dioxide, the amount of air blended via valve 129 is reduced to provide an oxygen-lean regeneration gas, thereby depleting the oxygen concentration in the reaction vessel 1. Reaction vessel 1 may then be repressurized with steam, feed gas, or product gas. Following repressurization, the reaction vessel proceeds to the production step and the cycle is repeated as described earlier.

Reaction vessels 2, 3, and 4 are operated through the same cycle steps described above for reaction vessel 1, but the cycles are staggered as shown in FIG. 2, so that they operate to provide a continuous supply of hydrogen-enriched product gas.

At the appropriate time, hydrocarbon-containing feed gas flows via valves 111, 211, 311, and 411 to conduits 101, 201, 301, and 401, respectively. Steam is added via valves 112, 212, 312, and 412 to conduits 102, 202, 302, and 402, respectively.

At the appropriate time according the cycle schedule in FIG. 2, feed gas from conduit 101 is mixed with steam from conduit 102 to form a hydrocarbon-steam feed mixture which flows via conduit 103 to hydrogen reaction vessel 1. Feed gas from conduit 201 is mixed with steam from conduit 202 to form a hydrocarbon-steam feed mixture which flows via conduit 203 to hydrogen reaction vessel 2. Feed gas from conduit 301 is mixed with steam from conduit 302 to form a hydrocarbon-steam feed mixture which flows via conduit 303 to hydrogen reaction vessel 3. Feed gas from conduit 401 is mixed with steam from conduit 402 to form a hydrocarbon-steam feed mixture which flows via conduit 403 to hydrogen reaction vessel 4.

Effluent from reaction vessels 1, 2, 3, and 4 flows through conduits 105, 205, 305, and 405, respectively and is routed according to the vessels' cycle step. Hydrogen-enriched product gas from reaction vessels 1, 2, 3, and 4 is fed through valves 121, 221, 321, and 421, respectively to conduits 106, 206, 306 and 406, respectively. During depressurization, blowdown gas from reaction vessels 1, 2, 3, and 4 is fed through open valves 122, 222, 322, and 422, respectively to conduits 107, 207, 307, and 407, respectively. During removal of residual hydrogen and/or hydrocarbon feed gas, gas effluent from reaction vessels 1, 2, 3, and 4 is fed through valves 122, 222, 322, and 422, respectively to conduits 107, 207, 307, and 407, respectively. During oxygen-rich gas regeneration, regeneration gas effluent from reaction vessels 1, 2, 3, and 4 is fed through valves 124, 224, 324, and 424, respectively to conduits 109, 209, 309, and 409, respectively.

During oxygen-rich regeneration of reaction vessels 1, 2, 3, and 4, effluent gas from conduits 109, 209, 309, and 409, is recycled via valves 127, 227, 327, and 427, respectively and blended with air via valves 129, 229, 329, and 429, respectively, thereby forming the oxygen-rich regeneration gas in conduits 104, 204, 304, and 404, respectively.

For the case where the oxygen-lean regeneration gas comprises regeneration gas effluent from another vessel, the oxygen-lean regeneration gas flows via conduit 142 through conduits 114, 214, 314, and 414, through valves 127, 227, 327 and 427, respectively, through conduits 104, 204, 304, and 404, respectively, to reaction vessels 1, 2, 3, and 4, respectively.

Although detailed using a system having 4 reaction vessels, any suitable number of reaction vessels in parallel may be used in staggered operation to achieve continuous hydrogen production. In practice, the duration of the hydrogen production step using a particular complex metal oxide may be different than the duration of the regeneration step. For example, if the regeneration step is twice as long as the production step, a configuration employing three parallel beds may be advantageously used wherein two beds are being regenerated while the third bed is used for hydrogen production.

Results of experiments illustrating the affect purging with a gas without oxygen versus regenerating with oxygen-lean regeneration gas are presented below. The following examples are illustrative of the present invention but do not limit the invention to any of the specific details described therein.

EXAMPLE 1

Synthesis of Complex Metal Oxide $Ca_2FeMnO_5$

The synthesis of complex metal oxide, $Ca_2FeMnO_5$, was realized by calcination of a carbonate precursor, nominally $Ca_2FeMn(CO_3)_x$. Several batches of carbonate precursor were prepared by precipitation of soluble salts in aqueous $NaHCO_3$. An aqueous solution was prepared by dissolving $Ca(NO_3)_2.4H_2$, $Fe(NO_3)_3.9H_2$, and $MnCl_2.4H_2O$ in deionized water in a 2 to 1 to 1 molar ratio. The resulting solution volume was 40 mL with a $Ca^{2+}$ concentration of 0.46 M. A flask containing 300 mL of 1.0 M $NaHCO_3$ was heated to between 80 to 95° C. and stirred vigorously without $CO_2$ gas purge. The Ca—Fe—Mn solution was added dropwise to the $NaHCO_3$ solution, resulting in a brownish precipitate. Once the precipitation was complete, the solid was collected by filtration and rinsed repeatedly. Following brief air drying, the solid was added to 1 L of water, stirred briefly, filtered, and rinsed repeatedly. This washing procedure was repeated a second time. The carbonate product was dried at 100° C. for 12 h in an air purged oven. To obtain the oxide product, the carbonate product was transferred to a porcelain crucible and was heated in an air-purged oven to 100° C. for 2 h, then heated at a rate of 2° C./min up to 750° C. and held at 750° C. for 12 h. The product was a black solid, nominally $Ca_2FeMnO_5$. Elemental analysis confirmed the intended composition and also the presence of a significant concentration of sodium, 0.26 mole $Na^+$/mole carbonate and 0.28 mole $Na^+$/mole oxide.

EXAMPLE 2

Nitrogen Purge with Air Regeneration for 50 Cycles

A $Ca_2FeMnO_5$ sample (a portion of sample #19540-21-1) synthesized in Example 1 was placed in a Thermogravimetric Analyzer (TGA) and heated to 700° C. while purging with a nitrogen gas stream. The sample was then exposed to a simulated reformed gas containing $CO_2$ produced during the reforming reaction at 700° C. for 30 minutes to chemically adsorb carbon dioxide from the gas mixture by forming $CaCO_3$ and simultaneously reducing the oxidation state of the Fe/Mn oxides in the complex metal oxide. The weight gain due to sorption of $CO_2$ by the complex metal oxide material was recorded by the TGA. The complex metal oxide material became saturated with $CO_2$ and was then regenerated by first purging the sample with nitrogen for 1 minute, heating the sample to 750° C. in air, and continuing to expose the sample to air for 30 minutes. The exposure to air decomposed the $CaCO_3$, generating $CO_2$, and raising the oxidation state of the Fe/Mn oxides in the complex metal oxide material. The weight loss due to $CO_2$ removal from the complex metal oxide sample was recorded by the TGA. The cycling between exposing complex metal oxide sample to $CO_2$-containing gas, nitrogen purge, and air exposure was repeated for a total of 50 cycles.

After the first cycle, the complex metal oxide sample had a weight gain of about 24.2% when exposed to the $CO_2$-containing gas at 700° C. due to sorption of $CO_2$. The sample lost all the gained weight when purged with nitrogen and regenerated with air at 750° C. The weight gain remained the same for the next 2 cycles, but then gradually decreased with successive cycles. The weight gain was about 22.7% after 50 cycles. This means that the complex metal oxide sample lost close to 6% $CO_2$ retention capacity after just 50 cycles. This decreased $CO_2$ retention capacity is not desirable.

EXAMPLE 3

Nitrogen Purge with Air Regeneration for 556 Cycles

The conditions in Example 2 using another portion of sample #19540-21-1 were repeated but for 556 cycles. After the first cycle, the complex metal oxide sample had a weight gain of about 24.2% when exposed to the $CO_2$-containing simulated reformed gas at 700° C. due to sorption of $CO_2$. The sample lost all the gained weight when purged with nitrogen and regenerated with air at 750° C. The weight gain remained the same for the next 2 cycles, but then gradually decreased with successive cycles. The weight gain was about 18.8% after 556 cycles. This means that the complex metal oxide sample lost close to 22% $CO_2$ retention capacity after just 556 cycles. This decreased $CO_2$ retention capacity is not desirable.

EXAMPLE 4

Air Regeneration for 50 Cycles without Transitional Nitrogen Purge

A $Ca_2FeMnO_5$ sample (a portion of sample #19540-21-1) was placed in the Thermogravimetric Analyzer (TGA) and heated to 700° C. while purging with a nitrogen gas stream. The sample was then exposed to a $CO_2$-containing simulated reformed gas at 700° C. for 30 minutes to chemically adsorb carbon dioxide from the gas mixture by forming $CaCO_3$ and simultaneously reducing the oxidation state of the Fe/Mn oxides in the complex metal oxide. The weight gain due to sorption of $CO_2$ by the complex metal oxide material was recorded by the TGA. The complex metal oxide material became saturated with $CO_2$ and was then regenerated by heating the sample to 750° C. in air (without first purging with nitrogen), and continuing to expose the sample to air for 30 minutes. The exposure to air decomposed the $CaCO_3$, generating $CO_2$, and raising the oxidation state of the Fe/Mn oxides in the complex metal oxide material. The weight loss due to $CO_2$ removal from the complex metal oxide sample was recorded by the TGA. The cycling between exposing complex metal oxide sample to a $CO_2$-containing gas, and air exposure was repeated for a total of 50 cycles.

After the first cycle, the complex metal oxide sample had a weight gain of about 24.2% when exposed to the $CO_2$-containing gas at 700° C. due to sorption of $CO_2$. The sample lost all the gained weight when regenerated with air at 750° C. The weight gain remained the same for the next 2 cycles, but then gradually increased with successive cycles. The weight gain was about 24.6% after 50 cycles. This means that the complex metal oxide sample gained $CO_2$ retention capacity after 50 cycles by this treatment. Maintaining or increasing $CO_2$ retention capacity is desirable.

This example showed that complex metal oxide material is more effectively regenerated by avoiding the inert nitrogen gas purge and exposing the spent sample to air directly. However, it is not practical or safe in a hydrogen production process to expose the spent bed of complex metal oxide directly to air without first removing flammable and combustible gases such as hydrogen and methane from the reaction vessel.

EXAMPLE 5

Air Regeneration for 50 Cycles without Transitional Nitrogen Purge

This example is essentially the same as Example 4, except that a different sample preparation was used to reaffirm the findings.

Another $Ca_2FeMnO_5$ sample that was prepared using the procedure similar to the sample #19540-21-1 (a portion of sample preparation #19786-81-2) was placed in the Thermogravimetric Analyzer (TGA) and heated to 700° C. while purging with a nitrogen gas stream. The sample was then exposed to the $CO_2$-containing simulated reformed gas at 700° C. for 30 minutes to chemically adsorb carbon dioxide from the gas mixture by forming $CaCO_3$ and simultaneously reducing the oxidation state of the Fe/Mn oxides in the complex metal oxide. The weight gain due to sorption of $CO_2$ by the complex metal oxide material was recorded by the TGA. The complex metal oxide material became saturated with $CO_2$ and was then regenerated by heating the sample to 750° C. in air (without first purging with nitrogen), and continuing to expose the sample to air for 30 minutes. The exposure to air decomposed the $CaCO_3$, generating $CO_2$, and raising the oxidation state of the Fe/Mn oxides in the complex metal oxide material. The weight loss due to $CO_2$ removal from the complex metal oxide sample was recorded by the TGA. The cycling between exposing complex metal oxide sample to the $CO_2$-containing gas, and air exposure was repeated for a total of 50 cycles.

After the first cycle, the complex metal oxide sample had a weight gain of about 24.4% when exposed to the $CO_2$-containing gas at 700° C. due to sorption of $CO_2$. The sample lost all the gained weight when regenerated with air at 750° C. The weight gain remained the same for the next 2 cycles, but then gradually increased with successive cycles. The weight gain was about 25.3% after 50 cycles. This means that the complex metal oxide sample gained $CO_2$ retention capacity after 50 cycles by this treatment, reaffirming the results of Example 4. Maintaining or increasing $CO_2$ retention capacity is desirable.

EXAMPLE 6

Oxygen-lean Purge with Air Regeneration for 50 Cycles

A $Ca_2FeMnO_5$ sample (a portion of sample preparation #19786-81-2) was placed in the TGA and heated to 700° C. while purging with a nitrogen gas stream. The sample was then exposed to the $CO_2$-containing simulated reformed gas at 700° C. for 30 minutes to chemically adsorb carbon dioxide from the gas mixture by forming $CaCO_3$ and simultaneously reducing the oxidation state of the Fe/Mn oxides in the complex metal oxide. The weight gain due to sorption of $CO_2$ by the complex metal oxide material was recorded by the TGA. The complex metal oxide material became saturated with $CO_2$ and was then regenerated by heating the sample to 750° C. in an oxygen-lean gas stream comprising 1% oxygen in nitrogen (without first purging with nitrogen), and continuing to expose the sample to the oxygen-lean gas stream for 30 minutes. The exposure to the oxygen-lean stream decomposed the $CaCO_3$, generating $CO_2$, and raising the oxidation state of the Fe/Mn oxides in the complex metal oxide material. The weight loss due to $CO_2$ removal from the complex metal oxide sample was recorded by the TGA. The cycling between exposing complex metal oxide sample to the $CO_2$-containing gas, and oxygen-lean gas exposure was repeated for a total of 50 cycles.

After the first cycle, the complex metal oxide sample had a weight gain of about 24.2% when exposed to the $CO_2$-containing gas at 700° C. due to sorption of $CO_2$. The sample lost all the gained weight when regenerated with the oxygen-lean gas stream at 750° C. The weight gain remained the same for the next 2 cycles, but then gradually increased with successive cycles. The weight gain was about 25.5% after 50 cycles. This means that the complex metal oxide sample gained $CO_2$ retention capacity after 50 cycles by this treatment. Surprisingly, the complex metal oxide was shown to be effectively regenerated solely by exposure to an oxygen-lean stream comprising only 1% oxygen.

EXAMPLE 7

Oxygen-Lean Purge with Air Regeneration for 50 Cycles

A $Ca_2FeMnO_5$ sample (a portion of sample preparation #19786-81-2) was placed in the TGA and heated to 700° C. while purging with a nitrogen gas stream. The sample was then exposed to the $CO_2$-containing simulated reformed gas at 700° C. for 30 minutes to chemically adsorb carbon dioxide from the gas mixture by forming $CaCO_3$ and simultaneously reducing the oxidation state of the Fe/Mn oxides in the complex metal oxide. The weight gain due to sorption of $CO_2$ by the complex metal oxide material was recorded by the TGA. The complex metal oxide material became saturated with $CO_2$ and was then regenerated by heating the sample to 750° C. in an oxygen-lean gas stream comprising 0.5% oxygen in nitrogen (without first purging with nitrogen), and continuing to expose the sample to the oxygen-lean gas stream for 30 minutes. The exposure to the oxygen-lean stream decomposed the $CaCO_3$, generating $CO_2$, and raising the oxidation state of the Fe/Mn oxides in the complex metal oxide material. The weight loss due to $CO_2$ removal from the complex metal oxide sample was recorded by the TGA. The cycling between exposing complex metal oxide sample to the $CO_2$-containing gas, and oxygen-lean gas exposure was repeated for a total of 50 cycles.

After the second cycle, the complex metal oxide sample had a weight gain of about 24.3% when exposed to the $CO_2$-containing gas at 700° C. due to sorption of $CO_2$. The sample lost all the gained weight when regenerated with the oxygen-lean gas stream at 750° C. The weight gain remained the same for the next 4 to 5 cycles, but then gradually increased with successive cycles. The weight gain was about 25.1% after 50 cycles. This means that the complex metal oxide sample gained $CO_2$ retention capacity after 50 cycles by this treatment. Surprisingly, the complex metal oxide was shown to be effectively regenerated solely by exposure to an oxygen-lean stream comprising only 0.5% oxygen.

The cycling between exposing complex metal oxide sample to the $CO_2$-containing gas, and oxygen-lean gas exposure was continued for another 50 cycles with the exception of using an oxygen-lean gas containing only 0.1% oxygen. The weight gain by the material after 2 additional cycles was about 26.8%. The sample lost all the gained weight when regenerated with the oxygen-lean gas stream at 750° C. Thereafter, the weight gain started to decrease gradually with successive cycles. The weight gain was about 24.9% after 50 cycles. This means that the complex metal oxide sample lost $CO_2$ retention capacity after 50 cycles by this treatment. This information showed that an oxygen-lean stream comprising only 0.1% oxygen was not as effective in regenerating complex metal oxide as an oxygen-lean stream comprising only 0.5% oxygen or 1.0% oxygen.

EXAMPLE 8

Synthesis of Complex Metal Oxide $Ca_2Mn_2O_5$

The synthesis of complex metal oxide, $Ca_2Mn_2O_5$, was realized by calcination of a carbonate precursor, $CaMn(CO_3)_2$. An aqueous solution was prepared by dissolving $Ca(NO_3)_2 \cdot 4H_2$ and $MnCl_2 \cdot 4H_2O$ in deionized water in a 1 to 1 molar ratio. The resulting solution volume was 40 mL with a $Ca^{2+}$ concentration of 0.52 M. A flask containing 285 mL of 1.0 M $NH_4HCO_3$ at room temperature was stirred vigorously without a $CO_2$ gas purge. The Ca—Mn solution was added dropwise to the $NH_4HCO_3$ solution, resulting in an off-white precipitate. Once the precipitation was complete, the solid was collected by filtration and rinsed repeatedly. Following brief air drying, the solid was added to 1 L of water, stirred briefly, filtered, and rinsed repeatedly. This washing procedure was repeated a second time. The carbonate product was dried at 100° C. for 12 h in an air purged oven. To obtain the oxide product, the carbonate product was transferred to a porcelain crucible and was heated in an air-purged oven to 100° C. for 2 h, then heated at a rate of 2° C./min up to 750° C. and held at 750° C. for 12 h. The product was a black solid, nominally $Ca_2Mn_2O_5$. Elemental analysis confirmed the intended composition.

EXAMPLE 9

Nitrogen Purge with Air Regeneration for 50 Cycles

A $Ca_2Mn_2O_5$ sample (a portion of sample #19873-46-3) synthesized in Example 8 was placed in a Thermogravimetric Analyzer (TGA) and heated to 700° C. while purging with a nitrogen gas stream. The sample was then exposed to a simulated reformed gas containing $CO_2$ produced during the reforming reaction at 700° C. for 30 minutes to chemically adsorb carbon dioxide from the gas mixture by forming $CaCO_3$ and simultaneously reducing the oxidation state of the Mn oxide in the complex metal oxide. The weight gain due to sorption of $CO_2$ by the complex metal oxide material was recorded by the TGA. The complex metal oxide material became saturated with $CO_2$ and was then regenerated by first purging the sample with nitrogen for 1 minute, heating the sample to 750° C. in air, and continuing to expose the sample to air for 30 minutes. The exposure to air decomposed the $CaCO_3$, generating $CO_2$, and raising the oxidation state of the Mn oxide in the complex metal oxide material. The weight loss due to $CO_2$ removal from the complex metal oxide sample was recorded by the TGA. The cycling between exposing complex metal oxide sample to $CO_2$-containing gas, nitrogen purge, and air exposure was repeated for a total of 50 cycles.

After the first two cycles, the complex metal oxide sample had a weight gain of about 22.0% when exposed to the $CO_2$-containing gas at 700° C. due to sorption of $CO_2$. The sample lost all the gained weight when purged with nitrogen and regenerated with air at 750° C. The weight gain then gradually decreased with successive cycles. The weight gain was about 21.3% after 50 cycles. This means that the complex metal oxide sample lost close to 3% $CO_2$ retention capacity after just 50 cycles. This decreased $CO_2$ retention capacity is not desirable.

EXAMPLE 10

Air Regeneration for 50 Cycles without Transitional Nitrogen Purge

A $Ca_2Mn_2O_5$ sample (a portion of sample #19873-46-3) was placed in the Thermogravimetric Analyzer (TGA) and heated to 700° C. while purging with a nitrogen gas stream. The sample was then exposed to a $CO_2$-containing simulated reformed gas at 700° C. for 30 minute to chemically adsorb carbon dioxide from the gas mixture by forming $CaCO_3$ and simultaneously reducing the oxidation state of the Mn oxide in the complex metal oxide. The weight gain due to sorption of $CO_2$ by the complex metal oxide material was recorded by the TGA. The complex metal oxide material became saturated with CO2 and was then regenerated by heating the sample to 750° C. in air (without first purging with nitrogen), and continuing to expose the sample to air for 30 minute. The exposure to air decomposed the $CaCO_3$, generating $CO_2$, and raising the oxidation state of the Mn oxide in the complex metal oxide material. The weight loss due to $CO_2$ removal from the complex metal oxide sample was recorded by the TGA. The cycling between exposing complex metal oxide sample to a $CO_2$-containing gas, and air exposure was repeated for a total of 50 cycles.

After the first two cycles, the complex metal oxide sample had a weight gain of about 22.1% when exposed to the $CO_2$-containing gas at 700° C. due to sorption of $CO_2$. The sample lost all the gained weight when regenerated with air at 750° C. The weight gain then gradually increased with successive cycles. The weight gain was about 22.7% after 50 cycles. This means that the complex metal oxide sample gained $CO_2$ retention capacity after 50 cycles by this treatment. Maintaining or increasing $CO_2$ retention capacity is desirable.

This example showed that complex metal oxide material is more effectively regenerated by avoiding the inert nitrogen gas purge and exposing the spent sample to air directly. Similar regeneration results are expected with the use of an oxygen-lean gas instead of air.

Since oxygen-lean gas streams containing less than about 2 volume % oxygen do not form an explosive or combustible mixture with a flammable and combustible gas such as hydrogen and/or methane and the rise in temperature of the reactor head space due to reaction between oxygen and hydrogen/methane was calculated to be acceptable, it is practical to expose spent bed of complex metal oxide to an oxygen-lean gas stream containing up to and including 2 volume % oxygen without first purging flammable and combustible gases such as hydrogen and methane from the bed. This means that an oxygen-lean gas stream containing greater than 0.1 volume % up to and including 2 volume % oxygen may be effectively used to both remove combustible gases from the reaction vessel and regenerate the spent complex metal oxide material.

What is claimed is:

1. A process for producing a hydrogen-containing gas comprising:

introducing a hydrocarbon feed gas and steam into a first reaction vessel containing at least one complex metal oxide and at least one steam-hydrocarbon reforming catalyst thereby forming a combustible gas mixture comprising hydrogen in the first reaction vessel;

introducing at least one first reaction vessel void volume of a first regeneration gas comprising greater than 0.1 volume % oxygen up to and including 2 volume % oxygen into the first reaction vessel thereby displacing at least a portion of the combustible gas mixture from the first reaction vessel with the first regeneration gas without prior purging with a gas containing less than 0.1 volume % oxygen; and introducing a second regeneration gas comprising 2 volume % to 21 volume % oxygen into the first reaction vessel thereby further regenerating the at least one complex metal oxide.

2. The process of claim 1 further comprising:

withdrawing a regeneration effluent gas comprising at least 50 ppm oxygen from the first reaction vessel when the regeneration effluent gas comprises a portion of the first regeneration gas.

3. The process of claim 1 further comprising:

introducing at least one first reaction vessel void volume of a third regeneration gas comprising greater than 0.1 volume % oxygen up to and including 2 volume % oxygen into the first reaction vessel thereby displacing at least a portion of the second regeneration gas from the first reaction vessel with the third regeneration gas.

4. The process of claim 1 wherein the at least one complex metal oxide is represented by the formula:

$A_xB_yO_n$ wherein A is calcium; x is a number from 1 to 2, inclusive; B is at least one of iron and manganese; y is a number from 1 to 2, inclusive; and n represents a value such that the complex metal oxide is rendered electrically neutral, the process further comprising:

chemically adsorbing carbon dioxide to form $CaCO_3$ during at least a portion of the step of introducing the hydrocarbon feed gas.

5. The process of claim 1 wherein the at least one complex metal oxide is represented by the formula:

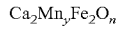
$Ca_2Mn_yFe_zO_n$ wherein $0 \leq y \leq 2$, $0 \leq z \leq 2$, $y+z=2$, and $3 \leq n \leq 7$, the process further comprising:

chemically adsorbing carbon dioxide to form $CaCO_3$ during at least a portion of the step of introducing the hydrocarbon feed gas.

6. The process of claim 5 wherein the at least one complex metal oxide comprises at least one of $Ca_2MnFeO_5$, $Ca_2Mn_2O_5$, and $Ca_2Fe_2O_4$.

7. The process of claim 1 wherein the first regeneration gas comprises at least a portion of a regeneration effluent gas from a second reaction vessel.

8. The process of claim 1 wherein the second regeneration gas comprises at least one of a flue gas and at least a portion of a regeneration effluent gas from a second reaction vessel.

9. The process of claim 3 wherein the third regeneration gas comprises at least a portion of a regeneration effluent gas from a second reaction vessel.

10. The process of claim 1 further comprising:

blending an oxygen-containing gas with at least a portion of a regeneration effluent gas from a second reaction vessel thereby forming the first regeneration gas.

11. The process of claim 1 further comprising:

blending an oxygen-containing gas with at least a portion of a regeneration effluent gas from a second reaction vessel thereby forming the second regeneration gas.

12. The process of claim 3 further comprising:

blending an oxygen-containing gas with at least a portion of a regeneration effluent gas from a second reaction vessel thereby forming the third regeneration gas.

13. The process of claim 1 wherein the first regeneration gas comprises at least a portion of a regeneration effluent gas from the first reaction vessel.

14. The process of claim 1 wherein the second regeneration gas comprises at least a portion of a regeneration effluent gas from the first reaction vessel.

15. The process of claim 3 wherein the third regeneration gas comprises at least a portion of a regeneration effluent gas from the first reaction vessel.

16. The process of claim 1 further comprising:

blending an oxygen-containing gas with at least a portion of a regeneration effluent gas from the first reaction vessel thereby forming the first regeneration gas.

17. The process of claim 1 further comprising:

blending an oxygen-containing gas with at least a portion of a regeneration effluent gas from the first reaction vessel thereby forming the second regeneration gas.

18. The process of claim 3 further comprising:

blending an oxygen-containing gas with at least a portion of a regeneration effluent gas from the first reaction vessel thereby forming the third regeneration gas.

19. A process for producing a hydrogen-containing gas comprising:

introducing a hydrocarbon feed gas and steam into a first reaction vessel containing at least one steam-hydrocarbon reforming catalyst and at least one complex metal oxide, wherein the at least one complex metal oxide comprises at least one of $Ca_2MnFeO_5$, $Ca_2Mn_2O_5$, and $Ca_2Fe_2O_4$, thereby forming a combustible gas mixture comprising hydrogen in the first reaction vessel;

introducing at least one first reaction vessel void volume of a first regeneration gas comprising greater than 0.1 volume % oxygen up to and including 2 volume % oxygen into the first reaction vessel thereby displacing at least a portion of the combustible gas mixture from the first reaction vessel with the first regeneration gas without prior purging with a gas containing less than 0.1 volume % oxygen;

withdrawing a first regeneration effluent gas comprising at least 50 ppm oxygen from the first reaction vessel when the first regeneration effluent gas comprises a portion of the first regeneration gas;

introducing a second regeneration gas comprising 2 volume % to 21 volume % oxygen into the first reaction vessel thereby further regenerating the at least one complex metal oxide; and blending an oxygen-containing gas with at least a portion of a second regeneration effluent gas from the first reaction vessel thereby forming the second regeneration gas.

20. A process for producing a hydrogen-containing gas comprising:

a production step in which a feed mixture of a hydrocarbon and steam is introduced into a reaction vessel containing a complex metal oxide and a steam-hydrocarbon reforming catalyst, the feed mixture is reacted in the presence of the complex metal oxide and the steam-hydrocarbon reforming catalyst to form hydrogen and a spent solid comprising metal carbonate and a reduced oxide at a reaction pressure, the hydrogen-containing gas is withdrawn from the reaction vessel, and a combustible gas mixture is formed in the reaction vessel when the production step has ended;

a blowdown step in which a blowdown gas is removed from the reaction vessel and the pressure in the reaction vessel is reduced;

a first regeneration step in which the spent solid is partially regenerated with at least one reaction vessel void volume of a first regeneration gas comprising 0.1 volume % to 2 volume % without prior purging with a pas containing less than 0.1 volume % oxygen;

a second regeneration step in which the spent solid is regenerated with a second regeneration gas comprising 2 volume % to 21 volume %;

a third regeneration step in which at least one reaction vessel void volume of a third regeneration gas comprising 0.1 volume % to 2 volume % is introduced into the reaction vessel; and a repressurization step in which the reaction vessel is pressurized to the reaction pressure;

wherein the reaction vessel is sufficiently depleted of the combustible gas mixture after the first regeneration step to allow safe introduction of the second regeneration gas in the second regeneration step.

* * * * *